(12) United States Patent
Xiang et al.

(10) Patent No.: US 11,120,751 B2
(45) Date of Patent: Sep. 14, 2021

(54) DISPLAY DEVICE AND CONTROL METHOD THEREOF

(71) Applicants: BEIJING BOE OPTOELECTRONICS TECHNOLOGY CO., LTD., Beijing (CN); BOE TECHNOLOGY GROUP CO., LTD., Beijing (CN)

(72) Inventors: Desheng Xiang, Beijing (CN); Xi Chen, Beijing (CN); Jianye Tang, Beijing (CN); Gaowei Chen, Beijing (CN); Sa Li, Beijing (CN); Yadong Zhang, Beijing (CN); Dawei Wang, Beijing (CN); Jiaqiang Wang, Beijing (CN); Jian Ren, Beijing (CN); Yanming Wang, Beijing (CN); Cheng Chang, Beijing (CN)

(73) Assignees: BEIJING BOE OPTOELECTRONICS TECHNOLOGY CO., LTD., Beijing (CN); BOE TECHNOLOGY GROUP CO., LTD., Beijing (CN)

( * ) Notice: Subject to any disclaimer, the term of this patent is extended or adjusted under 35 U.S.C. 154(b) by 0 days.

(21) Appl. No.: 16/611,452

(22) PCT Filed: Feb. 12, 2019

(86) PCT No.: PCT/CN2019/074824
§ 371 (c)(1),
(2) Date: Nov. 6, 2019

(87) PCT Pub. No.: WO2019/218731
PCT Pub. Date: Nov. 21, 2019

(65) Prior Publication Data
US 2020/0211480 A1    Jul. 2, 2020

(30) Foreign Application Priority Data

May 18, 2018 (CN) .......................... 201810478760.1

(51) Int. Cl.
*G09G 3/34* (2006.01)
*G09G 3/36* (2006.01)

(52) U.S. Cl.
CPC ......... *G09G 3/3406* (2013.01); *G09G 3/3666* (2013.01); *G09G 2320/0626* (2013.01); *G09G 2360/144* (2013.01)

(58) Field of Classification Search
CPC .... G09G 3/3406; G09G 3/366; G09G 3/3208; G09G 3/3648; G09G 3/36;
(Continued)

(56) References Cited

U.S. PATENT DOCUMENTS

2013/0083080 A1* 4/2013 Rappoport ........... G09G 3/3225
345/690
2015/0091953 A1* 4/2015 Wu ....................... G09G 3/2007
345/690

(Continued)

FOREIGN PATENT DOCUMENTS

| CN | 106921767 A | * | 7/2017 | |
| CN | 106921767 A | * | 7/2017 | ............... G09G 3/20 |

(Continued)

OTHER PUBLICATIONS

International Search Report received for PCT Patent Application No. PCT/CN2019/074824, dated May 16, 2019, 7 pages (3 pages of English Translation and 4 pages of Original Document).
(Continued)

*Primary Examiner* — Brent D Castiaux
(74) *Attorney, Agent, or Firm* — Womble Bond Dickinson (US) LLP

(57) ABSTRACT

A display device and its control method are disclosed. The display device includes: a display panel including a first
(Continued)

display area and a second display area; at least one sensor located in the second display area and configured to operate according to the ambient light sensed by the second display area; wherein the second display area includes a plurality of staggered light-emitting areas and light-transmitting areas.

16 Claims, 8 Drawing Sheets

(58) Field of Classification Search
CPC ... G09G 2320/0626; G09G 2320/0233; G09G 2360/144; G09G 2300/023; G02F 1/13338; G02F 1/13471; G02F 1/133618; G02F 1/13318; G02F 1/13306; H01L 27/3227; H01L 27/3232
See application file for complete search history.

(56) References Cited

U.S. PATENT DOCUMENTS

| | | |
|---|---|---|
| 2015/0219948 A1 | 8/2015 | Kamimura et al. |
| 2016/0306173 A1* | 10/2016 | Tsukahara .............. G02B 27/02 |
| 2018/0166018 A1 | 6/2018 | Yang |
| 2019/0148466 A1 | 5/2019 | Guo et al. |
| 2019/0387083 A1* | 12/2019 | Chen ................. H04M 1/72403 |
| 2020/0066809 A1 | 2/2020 | Liu |

FOREIGN PATENT DOCUMENTS

| | | | | |
|---|---|---|---|---|
| CN | 107241466 A | | 10/2017 | |
| CN | 107610636 A | | 1/2018 | |
| CN | 107632454 A | | 1/2018 | |
| CN | 107995328 A | * | 5/2018 | |
| CN | 107995328 A | * | 5/2018 | .......... H04M 1/0266 |
| CN | 108666348 A | | 10/2018 | |
| CN | 108717244 A | | 10/2018 | |
| TW | 201839977 A | | 11/2018 | |

OTHER PUBLICATIONS

Office Action received for Chinese Patent Application No. 201810478760.1, dated Mar. 26, 2020, 13 pages (7 pages of English Translation and 6 pages of Office Action).

* cited by examiner

DISPLAY DEVICE AND CONTROL METHOD THEREOF

RELATED APPLICATION

The present application is the U.S. national phase entry of PCT/CN2019/074824, with an international filing date of Feb. 12, 2019, which claims the benefit of Chinese Patent Application No. 201810478760.1, filed on May 18, 2018, the entire disclosure of which is incorporated herein by reference.

TECHNICAL FIELD

The present disclosure relates to the technical field of display, in particular to a display device and its control method.

BACKGROUND

A full screen display device can provide a larger screen without increasing the overall size of the display device because of its high screen proportion (generally up to 80% or even more than 90%).

Generally, in order to ensure that all kinds of sensors (such as infrared sensor, light intensity sensor and image sensor) in the display device can sense light normally, slots (also known as notch slots) need to be made on the display panel of the full screen display device to ensure normal operation of the above sensors. However, the design of making slots will compromise the display effect of the full screen display device.

SUMMARY

In order to solve the above-mentioned and other possible problems, the present disclosure provides a display device and a control method thereof as well as a storage medium.

According to a first aspect of the present disclosure, a display device is provided, which comprises:

a display panel comprising a first display area and a second display area;

at least one sensor located in the second display area and configured to operate according to ambient light sensed thorough the second display area;

wherein the second display area comprises a plurality of staggered light-emitting areas and light-transmitting areas.

Alternatively, the display device further comprises:

a dimming film arranged between the display panel and the at least one sensor, an orthographic projection of the dimming film on the display panel covering at least the second display area;

wherein the dimming film has different transmittances under different electric field intensities.

Alternatively, t the second display area comprises a plurality of staggered first pixel units and transparent pixel units, each of the first pixel units comprising a light-emitting area, and each of the transparent pixel units comprising a light-transmitting area.

Alternatively, the second display area comprises a plurality of second pixel units, each of the second pixel units comprising at least one light-emitting area and at least one light-transmitting area.

Alternatively, the light-emitting areas and the light-transmitting areas of each second pixel unit are arranged alternately in turn along a first direction or along a second direction, and there is an angle between the first direction and the second direction.

Alternatively, the plurality of second pixel units are arranged along the first direction, and the light-emitting areas and light-transmitting areas of any two adjacent second pixel units are arranged alternately along the first direction; and/or, the plurality of second pixel units are arranged along the second direction, and the light-emitting areas and light-transmitting areas of any two adjacent second pixel units are arranged alternately along the second direction.

According to a second aspect of the present disclosure, a control method of a display device is provided for controlling the display device according to the first aspect. The method comprises:

providing first data signals to pixel units in the first display area of the display panel of the display device;

providing second data signals to pixel units in the second display area of the display panel, the second data signals having higher intensity than the first data signals.

Alternatively, the display device further comprises the dimming film arranged between the display panel and the at least one sensor; and the method further comprises:

adjusting the electric field intensity applied on the dimming film to make the dimming film opaque in response to the display panel being in a non-working state;

adjusting the electric field intensity applied on the dimming film to make the dimming film transparent in response to the display panel being in a working state.

Alternatively, adjusting the electric field intensity applied on the dimming film to make the dimming film transparent in response to the display panel being in a working state comprises:

adjusting the transmittance of the dimming film to be its upper limit in response to the display panel being switched from the non-working state to the working state, or in response to the display panel being in the working state and detection that a change of actual light intensity of ambient light is greater than a preset light intensity threshold;

and the method further comprises:

determining the actual light intensity of the ambient light according to the light intensity of ambient light detected by a light intensity sensor and the upper limit of the transmittance;

adjusting a brightness of the display panel according to the actual light intensity.

Alternatively, after determining the actual light intensity of the ambient light, the method further comprises:

adjusting the transmittance of the dimming film to be a specified transmittance according to the actual light intensity of the ambient light;

wherein the specified transmittance is smaller than the upper limit of the transmittance, and a product of the actual light intensity and the specified transmittance is greater than or equal to a lower light intensity sensing limit of the at least one sensor in the display device.

Alternatively, the display device further comprises a camera; when detecting activation of the camera, the method further comprises:

in response to detection of activation of the camera, controlling the transmittance of the dimming film to remain at its upper limit; or controlling the transmittance of the dimming film to remain at its upper limit and stopping providing data signals to the pixel units in the second display area.

According to a third aspect of the present disclosure, a control device for controlling any of the above display devices is provided, which comprises:

a first drive circuit configured to provide first data signals to pixel units in the first display area of the display panel of the display device;

a second drive circuit configured to provide second data signals to pixel units in the second display area of the display panel, the second data signals having higher intensity than the first data signals.

Alternatively, the display device further comprises the dimming film arranged between the display panel and the at least one sensor, and the orthographic projection of the dimming film on the display panel covers at least the second display area, and the dimming film has different transmittances under different electric field intensities; and the control device further comprises:

a first adjustment circuit configured to adjust the electric field intensity applied on the dimming film to make the dimming film opaque in response to the display panel being in a non-working state;

a second adjustment circuit configured to adjust the electric field intensity applied on the dimming film to make the dimming film transparent in response to the display panel being in a working state.

Alternatively, the control device further comprises a determining circuit and a third adjustment circuit, and the at least one sensor comprises a light intensity sensor, wherein the second adjustment circuit is further configured to adjust the transmittance of the dimming film to be its upper limit in response to the display panel being switched from the non-working state to the working state, or in response to the display panel being in the working state and detection that a change of actual light intensity of ambient light is greater than a preset light intensity threshold;

the determining circuit is configured to determine the actual light intensity of the ambient light according to the light intensity of ambient light detected by the light intensity sensor and the upper limit of the transmittance;

the third adjustment circuit is configured to adjust a brightness of the display panel according to the actual light intensity.

Alternatively, the second adjustment circuit is further configured to adjust the transmittance of the dimming film to be a specified transmittance according to the actual light intensity of the ambient light;

wherein the specified transmittance is smaller than the upper limit of the transmittance, and a product of the actual light intensity and the specified transmittance is greater than or equal to the light intensity sensing lower limit of the at least one sensor in the display device.

Alternatively, the at least one sensor further comprises a camera; and wherein the second adjustment circuit is further configured to control the transmittance of the dimming film to remain at its upper limit in response to detection of activation of the camera, so that the camera can effectively sense the ambient light.

According to a fourth aspect of the present disclosure, a computer-readable storage medium storing computer-executable instructions thereon is provided, the computer-executable instructions, when being executed on a processor, enable the processor to implement the control method of the display device as described in the second aspect.

According to a fifth aspect of the present disclosure, a computing device is provided, which comprises a processor and a memory, the memory being configured to store computer-executable instructions that are configured to enable the processor to implement the control method of the display device as described in the second aspect when being executed on the processor.

BRIEF DESCRIPTION OF THE DRAWINGS

In order to more clearly illustrate the technical solutions of the embodiments of the present disclosure, the accompanying drawings to be used in the description of the embodiments will be briefly described below. The drawings described below relate only to some embodiments of the present disclosure, and those skilled in the art can obtain other drawings from these drawings.

DETAILED DESCRIPTION OF EMBODIMENTS

In order to make objects, technical solutions and advantages of the present disclosure clearer, the embodiments of the present disclosure will be described in further detail in conjunction with the accompanying drawings.

Figure 1:
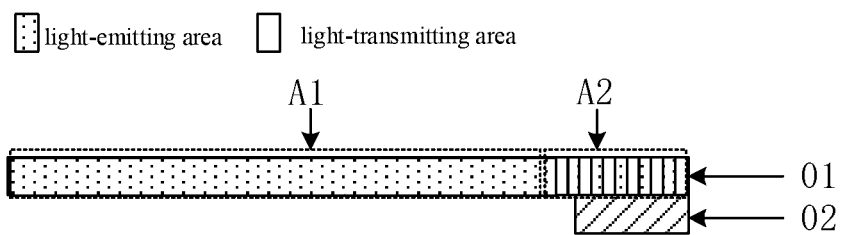
FIG. 1 is a schematic diagram of a display device provided in an embodiment of the present disclosure.

FIG. 1 is a schematic diagram of a display device provided in an embodiment of the present disclosure. As shown in FIG. 1, the display device may comprise: a display panel 01 and at least one sensor 02. The at least one sensor 02 can be arranged on a light entry side of the display panel 01. The at least one sensor 02 may include one or more of a light intensity sensor, a distance sensor, an image sensor, etc. The distance sensor can be an infrared radiation (IR) sensor for example, and the image sensor can be a camera for example.

Referring to FIG. 1, the display panel 01 may include a first display area A1 and a second display area A2, and the at least one sensor 02 may be located in the second display area A2.

Figure 2:
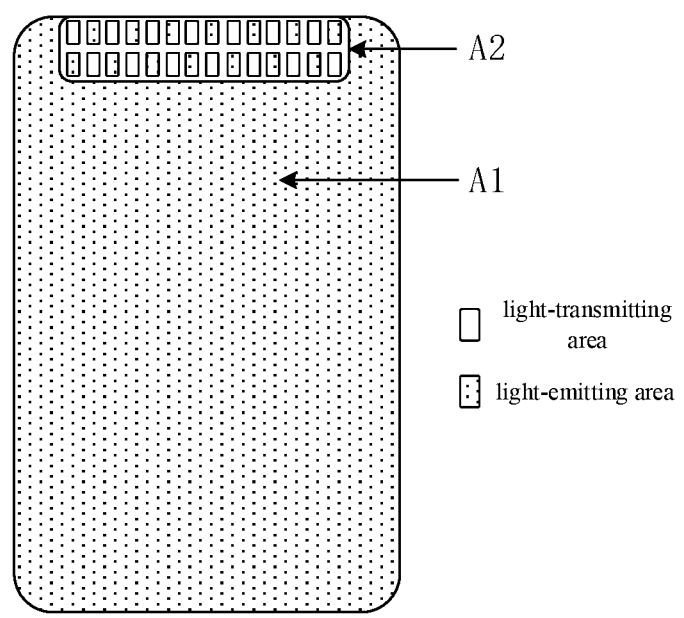
FIG. 2 is a top view of a display panel provided in an embodiment of the present disclosure.

FIG. 2 is a top view of a display panel provided in an embodiment of the present disclosure. It can be seen from FIG. 1 and FIG. 2 that the second display area A2 may include a plurality of staggered light-emitting areas and light-transmitting areas. The light-emitting areas can normally emit light and display images; the light-transmitting areas are used to transmit natural light, but not to display images.

In summary, the embodiment of the present disclosure provides a display device whose display panel includes a first display area and a second display area, the second display area includes a plurality of staggered light-emitting areas and light-transmitting areas. Therefore, at least one sensor disposed in the second display area can normally sense light through each of the light-transmitting areas. The display device provided in the embodiment of the present disclosure can ensure normal operation of the at least one sensor without making slots on the display panel, and will not affect the size and shape of the display panel, thus facilitating realization of a full screen display device and improving the display effect of the full screen display device.

Figure 3:
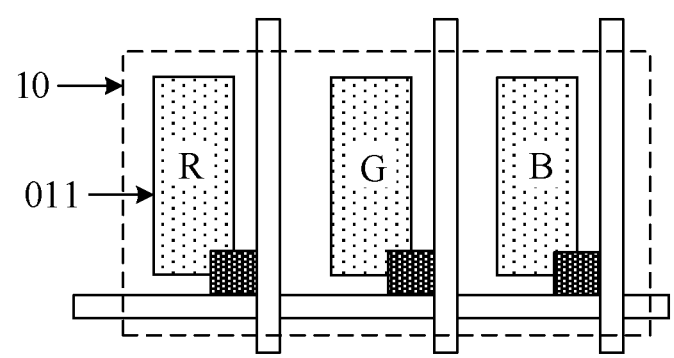
FIG. 3 is a schematic diagram of a pixel arranged in a first display area provided in an embodiment of the present disclosure.

It should be noted that in an embodiment of the present disclosure, multiple pixels can be arranged in the first display area A1 of the display panel 01, each pixel may include a plurality of first pixel units with different colors, and each first pixel unit can normally emit light and display images. FIG. 3 is a schematic diagram of a pixel arranged in the first display area provided in an embodiment of the present disclosure. As shown in FIG. 3, each pixel 10 in the first display area A1 may include three first pixel units 011 of different colors, which may be a red (R) pixel unit, a green (G) pixel unit and a blue (B) pixel unit, respectively.

Figure 4:
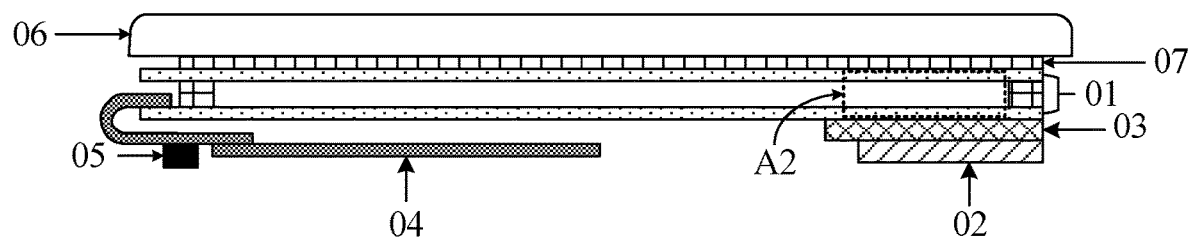
FIG. 4 is a schematic diagram of another display device provided in an embodiment of the present disclosure.

FIG. 4 is a schematic diagram of another display device provided in an embodiment of the present disclosure. Referring to FIG. 4, the display device may further comprise: a dimming film 03 arranged between the display panel 01 and the at least one sensor 02, an orthographic projection of the dimming film 03 on the display panel 01 covering at least the second display area A2 and the dimming film 03 having different transmittances under different electric field intensities.

When the dimming film 03 is adjusted to an opaque state (i.e. a transmittance of 0), the dimming film 03 can shield the at least one sensor in the display device and ensure the overall aesthetics of the display device. In this case, the at least one sensor stops working because it cannot sense light through the light-transmitting areas in the second display area A2. When the dimming film 03 is adjusted to a transparent state (i.e., a transmittance greater than 0), the at least one sensor can sense light through the light-transmitting areas in the second display area A2, so it can work normally. By arranging the dimming film, not only the aesthetics of the display device can be guaranteed, but also the control to the working state of the at least one sensor in the display device can become more flexible.

Figure 5:
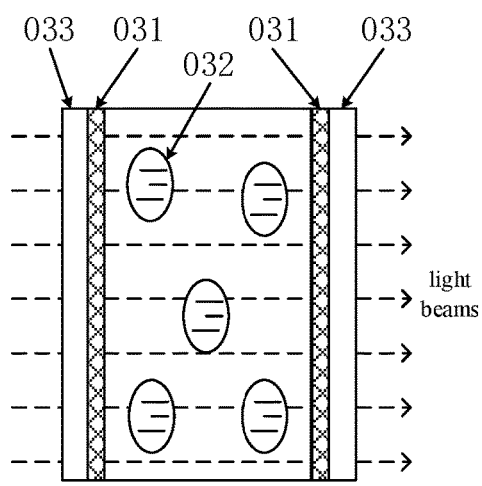
FIG. 5 is a schematic diagram of a dimming film provided in an embodiment of the present disclosure.

In an embodiment of the present disclosure, the dimming film 03 can be a polymer dispersed liquid crystal (PDLC) dimming film. FIG. 5 is a schematic diagram of a dimming film provided in an embodiment of the present disclosure. As shown in FIG. 5, the PDLC dimming film 03 may include two conductive films 031 arranged facing each other and a dispersed liquid crystal polymer material 032 arranged between the two conductive films 031. The dispersed liquid crystal polymer material 032 is prepared by mixing liquid crystal, polymer and photoinitiator crosslinking agent in a preset proportion and curing them at a certain temperature by ultraviolet irradiation. The dispersed liquid crystal polymer material 032 has the property of electro-change transmittance, namely, the electric field intensity between the two conductive films 031 can be adjusted by adjusting a voltage applied on the two conductive films 031, then a refractive index of liquid crystal droplets in the dispersed liquid crystal polymer material 032 can be adjusted, and finally the incident light flux can be adjusted.

Figure 6:
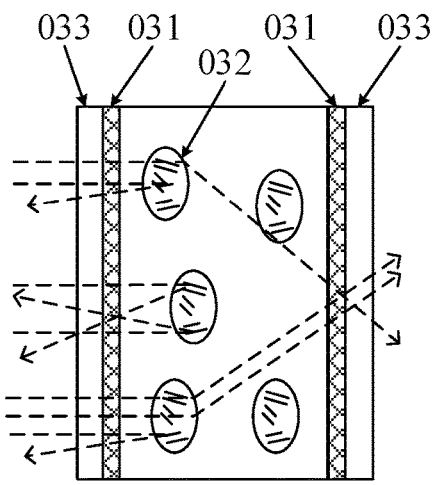
FIG. 6 is a schematic diagram of another dimming film provided in an embodiment of the present disclosure.

As shown in FIG. 5, when a voltage is applied to the two conductive films 031 to form an electric field with a certain intensity therebetween, orientations of the optical axes of the liquid crystal droplets in the dispersed liquid crystal polymer material 032 are parallel to the electric field direction, such that the incident light can exit through the dimming film. In this case, the dimming film 03 is in a light-transmitting state, i.e. a transparent state When no voltage is applied to the two conductive films 031, no electric field is formed therebetween, as shown in FIG. 6. In this case, the orientations of the optical axes of the liquid crystal droplets in the dispersed liquid crystal polymer material 032 are distributed randomly and disorderly, and the incident light are scattered in the dispersed liquid crystal polymer material 032, so that no light can exit through the dimming film, or only a small amount of light can exit through the dimming film. In this case, the dimming film 03 is in an opaque state, that is to say, the dimming film appears in a state of opaque fog.

As an example, the dimming film 03 may have a thickness of 0.15 mm. In addition, as can be seen from FIGS. 5 and 6, the dimming film 03 may also include two substrates 033 arranged facing each other, each having one conductive film 031 formed thereon.

As an example, the conductive films 031 can be flexible and transparent conductive films, such as indium tin oxide (ITO) films. The substrates 033 can be polyethylene terephthalate (PET) films.

Figure 7:
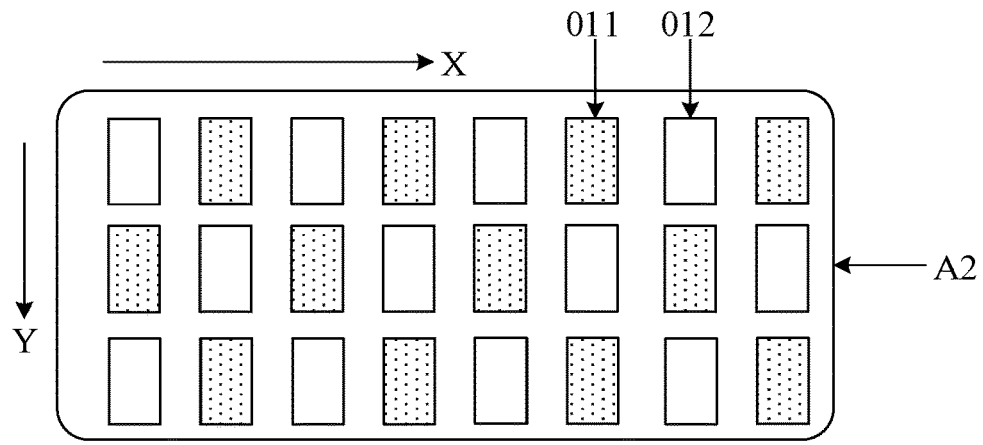
FIG. 7 is a schematic diagram of a second display area of a display panel provided in an embodiment of the present disclosure.

FIG. 7 is a schematic diagram of a second display area of a display panel provided in an embodiment of the present disclosure. As shown in FIG. 7, the second display area A2 may include a plurality of staggered first pixel units 011 and transparent pixel units 012. Each of the first pixel units 011 includes a light-emitting area, and each of the transparent pixel units 012 includes a light-transmitting area. That is to say, in the second display area A2, the first pixel units 011 can normally emit light and display images, while the transparent pixel units 012 transmit natural light, and cannot display images.

For example, when the display device is an organic light-emitting diode (OLED) display device, each first pixel unit 011 may include a thin film transistor and an OLED light-emitting device that may include a cathode, an anode and an electroluminescent layer of one color; while each transparent pixel unit 012 may not include the thin film transistor and OLED light-emitting device, or each transparent pixel unit 012 may include the cathode and anode of the OLED light-emitting device, but the electroluminescent layer therein is a transparent film layer formed by a transparent material. When the display device is a liquid crystal display device, each first pixel unit 011 may include a thin film transistor, a pixel electrode, a common electrode, a color resist layer of one color and liquid crystals, while each transparent pixel unit 012 may not include the thin film transistor, and the color resist layer therein is a transparent film layer.

In the embodiment of the present disclosure, when the display panel is in the working state, in order to guarantee the display effect of the second display area A2, the first pixel units 011 and the transparent pixel units 012 can be arranged alternately in turn along a first direction X or along a second direction Y; or as shown in FIG. 7, they can be arranged alternately in turn along the first direction X or along the second direction Y. There is an angle between the first direction X and the second direction Y, such as 90 degrees.

It shall be noted that the first pixel units and the transparent pixel units being arranged alternately in turn may mean that a transparent pixel unit is arranged in each of the pixel areas adjacent to each first pixel unit, or that several adjacent transparent pixel units are arranged every several adjacent first pixel units. For example, for each row of pixel units in the second display area A2, three adjacent transparent pixel units may be arranged every three adjacent first pixel units, which is not restrictive in this disclosure.

In the embodiment of the present disclosure, the first pixel units 011 and the transparent pixel units 012 in the second display area A2 are arranged alternately in turn to ensure the uniform and staggered arrangement of the light-emitting areas and light-transmitting areas in the second display area A2, thereby effectively alleviating the particle sensation of the image displayed by the second display area A2, and improving the display effect of the second display area A2.

Figure 8:
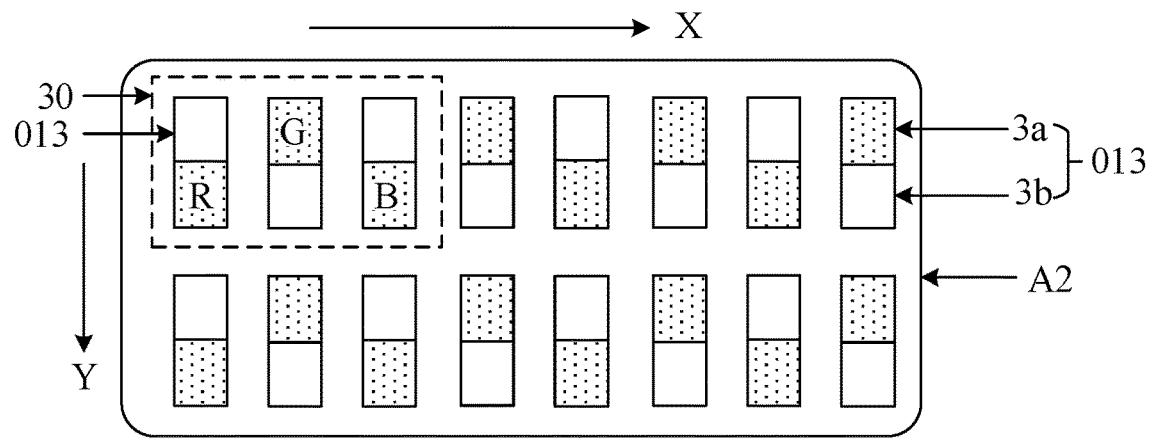
FIG. 8 is a schematic diagram of a second display area of another display panel provided in an embodiment of the present disclosure.

FIG. 8 is a schematic diagram of a second display area of another display panel provided in an embodiment of the present disclosure. As shown in FIG. 8, the second display area A2 may include a plurality of second pixel units 013, each including at least one light-emitting area 3a and at least one light-transmitting area 3b. For example, in the structure shown in FIG. 8, each second pixel unit 013 includes one light-emitting area 3a and one light-transmitting area 3b.

Figure 9:
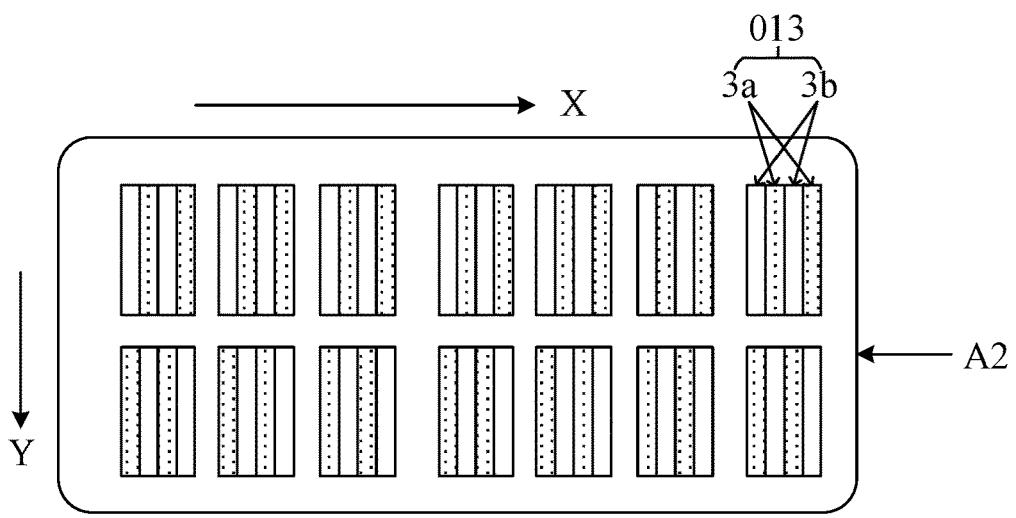
FIG. 9 is a schematic diagram of a second display area of still another display panel provided in an embodiment of the present disclosure.

FIG. 9 is a schematic diagram of a second display area of still another display panel provided in an embodiment of the present disclosure. As shown in FIG. 9, each second pixel unit 013 may include two light-emitting areas 3a and two light-transmitting areas 3b, and the light-emitting areas 3a and light-transmitting areas 3b of each second pixel unit 013 can be arranged alternately in turn along the first direction X, or the light-emitting areas 3a and light-transmitting areas 3b of each second pixel unit 013 can be arranged alternately in turn along the second direction Y. There is an angle between the first direction X and the second direction Y, for example, the first direction X can be perpendicular to the second direction Y.

For example, as shown in FIGS. 8 and 9, each second pixel unit 013 in the display panel can be a rectangular pixel unit, the first direction X can be a width direction of the second pixel unit 013, and the second direction Y can be a length direction of the second pixel unit 013.

In the embodiment of the present disclosure, among the plurality of second pixel units 013 arranged along the first direction X, the light-emitting areas 3a and light-transmitting areas 3b of any two adjacent second pixel units 013 are arranged alternately along the first direction X; and/or, among the plurality of second pixel units 013 arranged along the second direction Y, the light-emitting areas 3a and light-transmitting areas 3b of any two adjacent second pixel units 013 are arranged alternately along the second direction Y.

Figure 10:
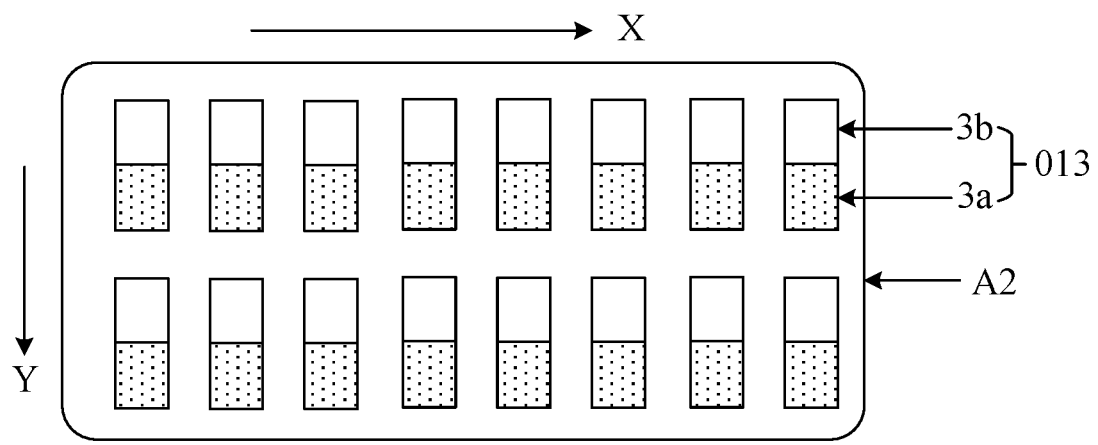
FIG. 10 is a schematic diagram of a second display area of yet another display panel provided in an embodiment of the present disclosure.

FIG. 10 is a schematic diagram of a second display area of yet another display panel provided in an embodiment of the present disclosure. As shown in FIG. 10, among the plurality of second pixel units 013 arranged along the second direction Y, the light-emitting areas 3a and light-transmitting areas 3b of any two adjacent second pixel units 013 are arranged alternately along the second direction Y; and among the plurality of second pixel units 013 arranged along the first direction X, the light-emitting areas 3a of any two adjacent second pixel units 013 are arranged sequentially, and so are the light-transmitting areas 3b.

Alternatively, as shown in FIGS. 8 and 9, among the plurality of second pixel units 013 arranged along the first direction X, the light-emitting areas 3a and light-transmitting areas 3b of any two adjacent second pixel units 013 are arranged alternately along the first direction X, and among the plurality of second pixel units 013 arranged along the second direction Y, the light-emitting areas 3a and light-transmitting areas 3b of any two adjacent second pixel units 013 are also arranged alternately along the second direction Y.

It should be noted that in the embodiment of the present disclosure, a plurality of pixels 30 may be arranged in the second display area, each pixel 30 may include a plurality of second pixel units of different colors, and the second pixel units of each color may be used to emit light of the corresponding color.

As shown in FIG. 8, each pixel 30 may include second pixel units 013 of three different colors, i.e. red (R), green (G) and blue (B).

Referring to FIG. 4, the display device provided in the embodiment of the present disclosure may further include a flexible printed circuit (FPC) 04, a drive integrated circuit (IC) 05, and a cover plate 06. The drive IC 05 can be fixed on the FPC 04 by means of the chip on film (COF) technology, and both the FPC 04 and the drive IC 05 are located on the light entry side of the display panel 01, i.e., they are on the same side as the at least one sensor 02. The cover plate 06 is located on a light exit side of the display panel 01 and can be adhered with the display panel 02 through a transparent optical clear adhesive (OCA) 07.

In the embodiment of the present disclosure, an electrode lead (i.e., a lead connected to the conductive film, not shown in FIG. 4) of the dimming film 03 can be connected to the FPC 04 or to a main board (e.g., a controller in the main board) of the display device, and can be powered by the power supply of the display device.

It should be noted that the display device provided in the embodiment of the present disclosure can be a full screen display device, such as any product or component with display function, including an OLED display device, a liquid crystal display device, electronic paper, a mobile phone, a tablet computer, a TV, a monitor, a notebook computer, a digital photo frame, a navigator, etc.

In summary, embodiments of the present disclosure provide a display device whose display panel includes a first display area and a second display area. The second display area includes a plurality of staggered light-emitting areas and light-transmitting areas, therefore at least one sensor arranged in the second display area can normally sense light through each of the light-transmitting areas. The display device provided in the embodiments of the present disclosure can ensure normal operation of at least one sensor without making slots on the display panel, and will not affect the size and shape of the display panel, thus facilitating the realization of a full screen display device and improving the display effect of the full screen display device.

Figure 11:
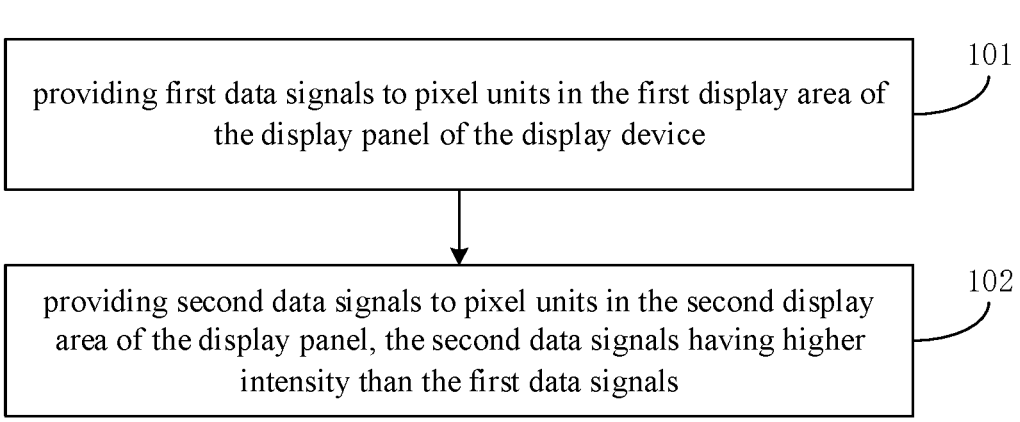
FIG. 11 is a flow chart of a control method of a display device provided in an embodiment of the present disclosure.

FIG. 11 is a flow chart of a control method of a display device provided in an embodiment of the present disclosure. Said method can be applied to the control device of the display device, and the control device can be a controller, such as a central processing unit (CPU), of the display device. Said control method can be used to control the display device shown in FIG. 1 or FIG. 4. As shown in FIG. 11, said control method may include:

step 101: providing first data signals to pixel units in the first display area of the display panel of the display device;

step 102: providing second data signals to pixel units in the second display area of the display panel, the second data signals having higher intensity than the first data signals.

When both data signals are current signals, the second data signals having higher intensity than the first data signals may mean that the current intensity of the second data signals is greater than that of the first data signals. When both data signals are voltage signals, the second data signals having higher intensity than the first data signals may mean that the voltage intensity of the second data signals is greater than that of the first data signals. Since the second display area includes the light-transmitting areas capable of transmitting ambient light, images displayed in the second display area will be disturbed by the ambient light. Therefore, by providing the second data signals with higher intensity to the pixel units in the second display area, the display brightness of the second display area can be increased, thus ensuring uniformity of the overall display brightness of the display panel.

In summary, embodiments of the present disclosure provide a control method for the display device, the display panel of the display device includes a first display area and a second display area. The second display area includes a plurality of staggered light-emitting areas and light-transmitting areas, and the at least one sensor disposed in the second display area may sense light normally through each of the light-transmitting areas. When controlling the display device to display images, data signals can be provided to the pixel units of each display area to enable the two display areas to display images, thus effectively improving the display effect of the display device. Furthermore, the pixel units in the second display area are provided with data signals of a higher intensity so as to ensure uniformity of the display brightness of the first display area and the second display area.

Figure 12:
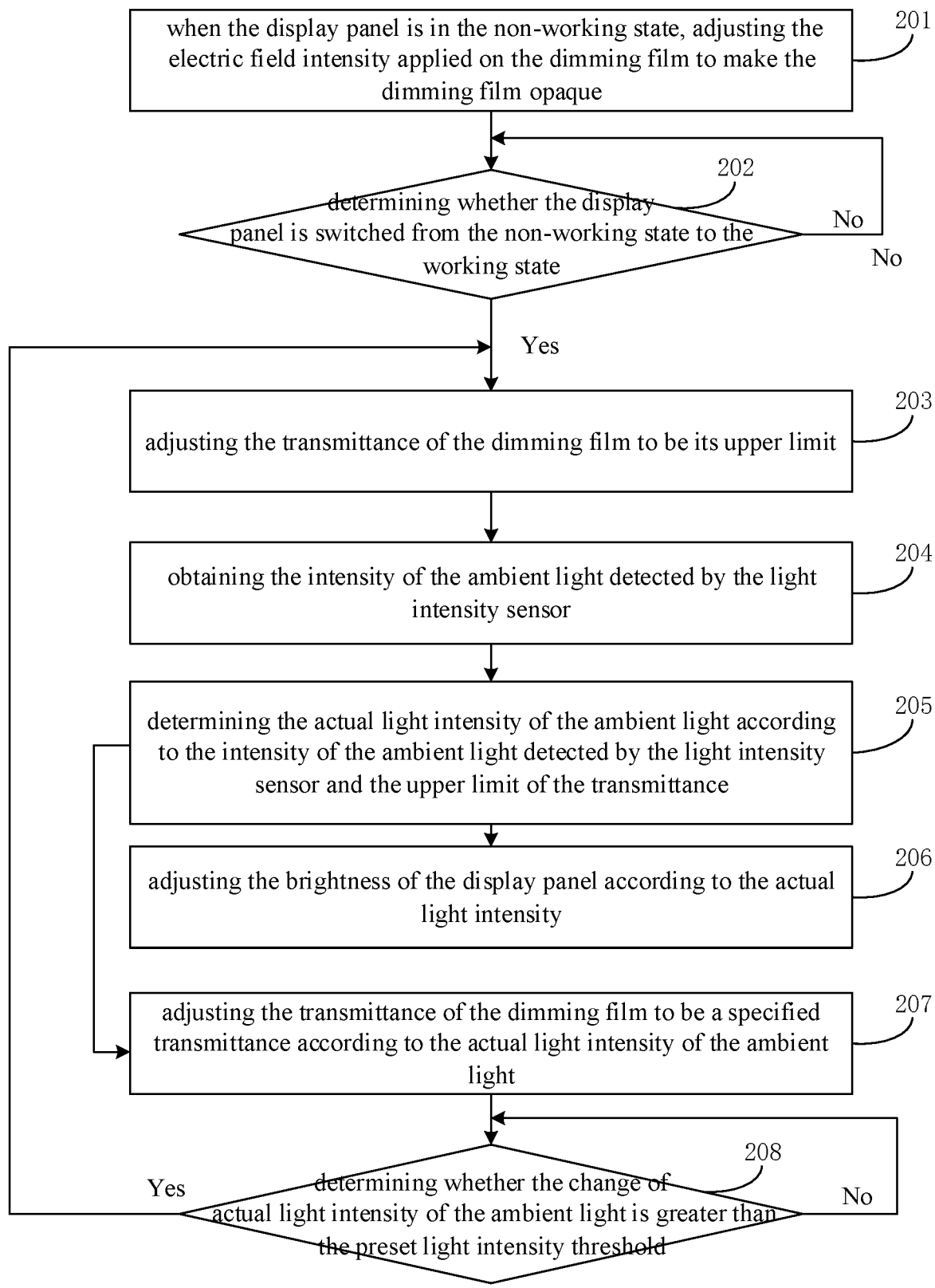
FIG. 12 is a flow chart of another control method of a display device provided in an embodiment of the present disclosure.

Alternatively, as shown in FIG. 4, the display device provided in the embodiment of the present disclosure may further comprise the dimming film 03 arranged between the display panel 01 and the at least one sensor 02. Correspondingly, FIG. 12 is a flow chart of a control method of the display device comprising the dimming film as provided in an embodiment of the present disclosure. As shown in FIG. 12, said method may include the following steps 201-208.

Step 201: when the display panel is in the non-working state, adjusting the electric field intensity applied on the dimming film to make the dimming film opaque.

When the display device is standby or the screen of the display device is off, the display panel does not display any image, and the display device is in the non-working state. In this case, the dimming film can be made opaque by adjusting the electric field intensity applied on the dimming film. In this case, the second display area of the display panel is in an opaque "fog state", which can shield the at least one sensor located on a side of the dimming film away from the display panel and make the full screen display device nice-looking.

As an example, application of voltage to the conductive films in the dimming film can be stopped. In this case, as shown in FIG. 6, the incident light are scattered in the dispersed liquid crystal polymer material 032 in the dimming film 03, so that no light exit through the dimming film, and the second display area becomes opaque.

Step 202: determining whether the display panel is switched from the non-working state to the working state, and executing step 203 when detecting that the display panel is switched from the non-working state to the working state; otherwise, continuing with step 202.

Step 203: adjusting the transmittance of the dimming film to be its upper limit.

When the display panel is switched from the non-working state to the working state, the display device provides data signals to each pixel unit in the display panel to enable the display panel to display images. At this time, the transmittance of the dimming film can be adjusted to the upper limit such that the light intensity sensor among the at least one sensor can accurately detect the light intensity of the ambient light even in a dark scene.

Step 204: obtaining the intensity of the ambient light detected by the light intensity sensor. After adjusting the transmittance of the dimming film to its upper limit, the intensity L1 of the ambient light detected by the light intensity sensor can be obtained.

Step 205: determining the actual light intensity of the ambient light according to the intensity of the ambient light detected by the light intensity sensor and the upper limit of the transmittance.

Owing to the existence of the dimming film, there is a certain error between the intensity of the ambient light detected by the light intensity sensor and the actual light intensity. In order to ensure accuracy of the finally determined actual intensity of the ambient light, the actual intensity of the ambient light can be determined according to the detected light intensity and the upper limit of the transmittance. For example, a quotient of the detected light intensity L1 and the transmittance upper limit T0 can be determined as the actual light intensity L0 of the ambient light, that is, the actual light intensity L0 satisfies: L0=L1/T0.

It shall be noted that since the transmittance of the dimming film is in a certain curve proportion to the voltage applied, the control device can determine the transmittance of the dimming film by the voltage applied on the dimming film.

Step 206: adjusting a brightness of the display panel according to the actual light intensity.

The control device can adjust the brightness of the display panel according to the determined actual light intensity of the ambient light, and the brightness of the display panel is positively correlated with the actual light intensity. That is, the greater the actual light intensity of the ambient light, the higher the brightness of the display panel, and the smaller the actual light intensity of the ambient light, the lower the brightness of the display panel.

Alternatively, the control device can adjust the brightness of the display panel by adjusting the intensities of the data signals provided to each of the pixel units. Furthermore, when adjusting the brightness of the display panel, the intensity of the second data signals provided to the pixel units in the second display area should be higher than the intensity of the first data signals provided to the pixel units in the first display area.

Step 207: adjusting the transmittance of the dimming film to be a specified transmittance according to the actual light intensity of the ambient light.

After step 205, the control device can lower the transmittance of the dimming film to a specified transmittance. The specified transmittance is smaller than the upper limit of the transmittance, and a product of the actual light intensity L0 and the specified transmittance T1 is greater than or equal to a light intensity sensing lower limit L2 of the at least one sensor in the display device. That is to say, the specified transmittance T1 satisfies L0×T1≥L2. The light intensity sensing lower limit refers to the minimum light intensity that can be sensed by the at least one sensor when it works steadily.

When the at least one sensor in the display device includes a plurality of sensors, the light intensity sensing lower limit L2 can be the maximum of the light intensity sensing lower limits of the multiple sensors, so that after adjusting the transmittance of the dimming film to the specified transmittance, each sensor can work steadily.

As an example, the at least one sensor includes a light intensity sensor and an infrared sensor, in which the light intensity sensing lower limit of the light intensity sensor is L21, the light intensity sensing lower limit of the infrared sensor is L22, and L21 is larger than L22, then the control device can determine that the light intensity sensing lower limit of the at least one sensor is L21.

Alternatively, when the at least one sensor in the display device includes a plurality of sensors, the control device can also calculate the specified transmittance corresponding to each sensor according to the light intensity sensing lower limit thereof; then the control device can adjust the transmittance of the dimming film to the maximum transmittance among the specified transmittances corresponding to the respective sensors.

As an example, the light intensity sensing lower limit of the light intensity sensor is L21, and its corresponding specified transmittance is T11, then T11 satisfies L0×T11≥L21; the light intensity sensing lower limit of the infrared sensor is L22, and its corresponding specified transmittance is T12, then T12 satisfies L0×T12≥L22. If T11 is larger than T12, the control device can adjust the transmittance of the dimming film to T11.

As mentioned above, when the second display area is in the transparent state, in order to ensure uniformity of the display brightness, the intensity of the second data signals of each of the pixel units in the second display area is higher, and the intensity of the second data signals is proportional to the transmittance of the dimming film, namely, the higher the transmittance of the dimming film, the better the transmittance of the second display area, and the higher the intensity of the second data signals correspondingly. Therefore, in the embodiment of the present disclosure, after adjusting the display brightness of the display panel, the transmittance of the dimming film is appropriately lowered to weaken the transmittance performance of the second display area, so that uniform display brightness can be achieved with a smaller intensity of the second data signals, thereby reducing power consumption of the display device and prolonging service life of each pixel unit in the second display area.

Step 208: determining whether the change of the actual light intensity of the ambient light is greater than a preset light intensity threshold.

In the embodiment of the present disclosure, when the display panel is in the working state, the light intensity sensor can also detect the light intensity of the ambient light in real time, and the control device can determine the actual light intensity of the ambient light in real time according to the detected light intensity, and determine in real time whether the change of the actual light intensity of the ambient light is greater than the preset light intensity threshold. Alternatively, the control device can directly determine whether the change of the detected light intensity detected by the light intensity sensor is greater than the preset light intensity threshold, and when the change of the detected light intensity is greater than the preset light intensity threshold, it can be determined that the change of the actual light intensity of the ambient light is also greater than the preset light intensity threshold.

When the control device determines that the change of the actual light intensity of the ambient light is greater than the preset light intensity threshold, step 203 can be executed, and steps 204 to 207 can be executed sequentially. That is to say, the control device can adjust the transmittance of the dimming film to its upper limit and then determine the actual light intensity of the ambient light again, and adjust the brightness of the display panel according to the actual light intensity, thus achieving the effect of flexibly adjusting the brightness of the display panel according to the change of the light intensity of the ambient light so as to ensure the display effect of the display panel.

For example, the display device is a mobile phone, and a user is using the mobile phone to watch videos in a dark environment. When the user turns on the light of the room, the ambient light intensity changes greatly, and if the mobile phone detects that the change of the actual light intensity of the ambient light is greater than the preset light intensity threshold, the transmittance of the dimming film can be adjusted to the upper limit, so that the light intensity sensor of the mobile phone can accurately detect the current ambient light intensity. Then the mobile phone can have the brightness of the display screen increased according to the detected actual light intensity so as to adapt to the change of the ambient light. Thus the brightness of mobile phone display screen can be accurately adjusted according to the change of the ambient light intensity so as to improve the user experience.

When the control device determines that the change of the actual intensity of the ambient light is not greater than the preset intensity threshold, it can be determined that the brightness of the display panel does not need to be adjusted, so step 208 can be continued to detect and determine whether the actual intensity of the ambient light is greater than the preset intensity threshold.

Figure 13:
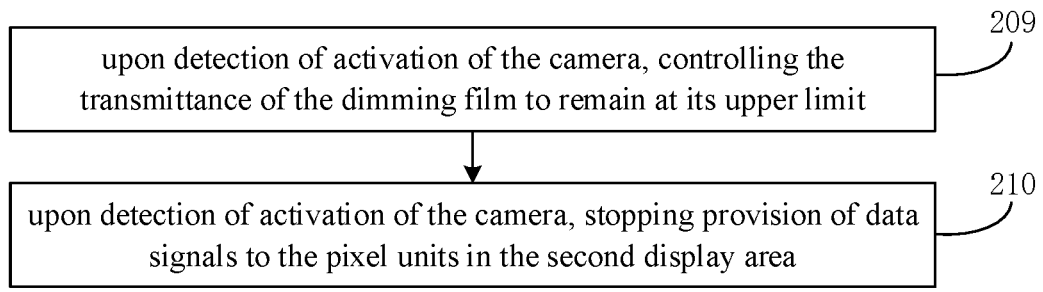
FIG. 13 is a flow chart of still another control method of a display device provided in an embodiment of the present disclosure.

Alternatively, in embodiments of the present disclosure, the display device may further include a camera. In this case, as shown in FIG. 13, the method may further include steps 209-210.

Step 209: upon detection of activation of the camera, controlling the transmittance of the dimming film to remain at its upper limit.

In embodiments of the present disclosure, when detecting activation of the camera, the transmittance of the dimming film should be maintained at its upper limit, so that the camera can effectively sense the ambient light to guarantee the quality of the image taken.

Alternatively, if the control device detects activation of the camera after step 203 and before step 207, an interrupt signal can be generated, which can be used to instruct step 207 to stop, while steps 204 to 206 can be normally performed.

Alternatively, if the control device detects activation of the camera after step 207, it can execute step 203 again, that is, to adjust the transmittance of the dimming film to its upper limit again and maintain the transmittance of the dimming film at the upper limit.

Step 210: upon detection of activation of the camera, stopping provision of data signals to the pixel units in the second display area.

In order to prevent the light emitted by the light-emitting areas in the second display area from interfering the light sensed by the camera and prevent influence to the quality of image-taking, the control device can also stop providing data signals to the pixel units in the second display area upon detection of activation of the camera, i.e. control the pixel units of the second display area to stop emitting light and displaying images.

When the control device detects that the camera is off, it can enter the control flow in the normal display mode, that is, it can continue to implement the methods shown in steps 201 to 208.

It shall be noted that in embodiments of the present disclosure, a distance sensor may be arranged in the display device. When the display device is in the working state, if a signal sent by the distance sensor is received, the screen of the display device can be controlled to be turned off, i.e., to control the display device to enter the non-working state. The distance sensor can send signals to the control device when detecting an obstruction (e.g. the user puts the terminal close to the ear when answering a phone call).

It shall also be noted that the sequence of the steps of the control method of the display device provided in the embodiments of the present disclosure can be adjusted appropriately, and the steps may be added or deleted according to actual situation. For example, step 207 may be executed before step 206 or concurrently with step 206; or step 210 may be executed concurrently with step 209, or step 210 may be deleted as appropriate; or step 209 and step 210 may be executed after step 208 or before step 208. Any variation of the method that can be easily obtained by a person skilled in the art within the scope of the technology disclosed in this disclosure shall fall within the scope of the protection of the present disclosure.

In summary, embodiments of the present disclosure provide a control method of the display device, the display panel of the display device includes a first display area and a second display area, the second display area includes a plurality of staggered light-emitting areas and light-transmitting areas, and at least one sensor disposed in the second display area can sense light normally through each of the light-transmitting areas. When controlling the display device to display images, data signals can be provided to the pixel units of each display area, so that the two display areas can both display images, thereby effectively improving the display effect of the display device. In addition, the pixel units in the second display area are provided with data signals of higher intensity, which can ensure uniformity of the display brightness of the first display area and the second display area.

Figure 14:
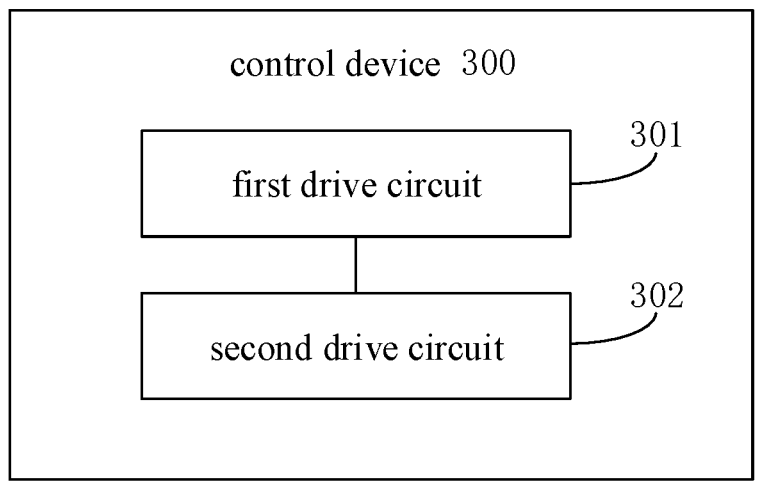
FIG. 14 is a schematic diagram of a control device of a display device provided in an embodiment of the present disclosure.

FIG. 14 is a schematic diagram of a control device 300 of a display device provided in an embodiment of the present disclosure. Said control device 300 can be a controller of the display device. The controller can be arranged independently from the drive integrated circuit in the display device or be integrated into the drive integrated circuit. The control device can be used to control the display device shown in FIG. 1 or FIG. 4. As shown in FIG. 14, the control device may comprise:

a first drive circuit 301 configured to provide first data signals to pixel units in the first display area of the display panel of the display device;

a second drive circuit 302 configured to provide second data signals to pixel units in the second display area of the display panel, the second data signals having higher intensity than the first data signals.

Figure 15:
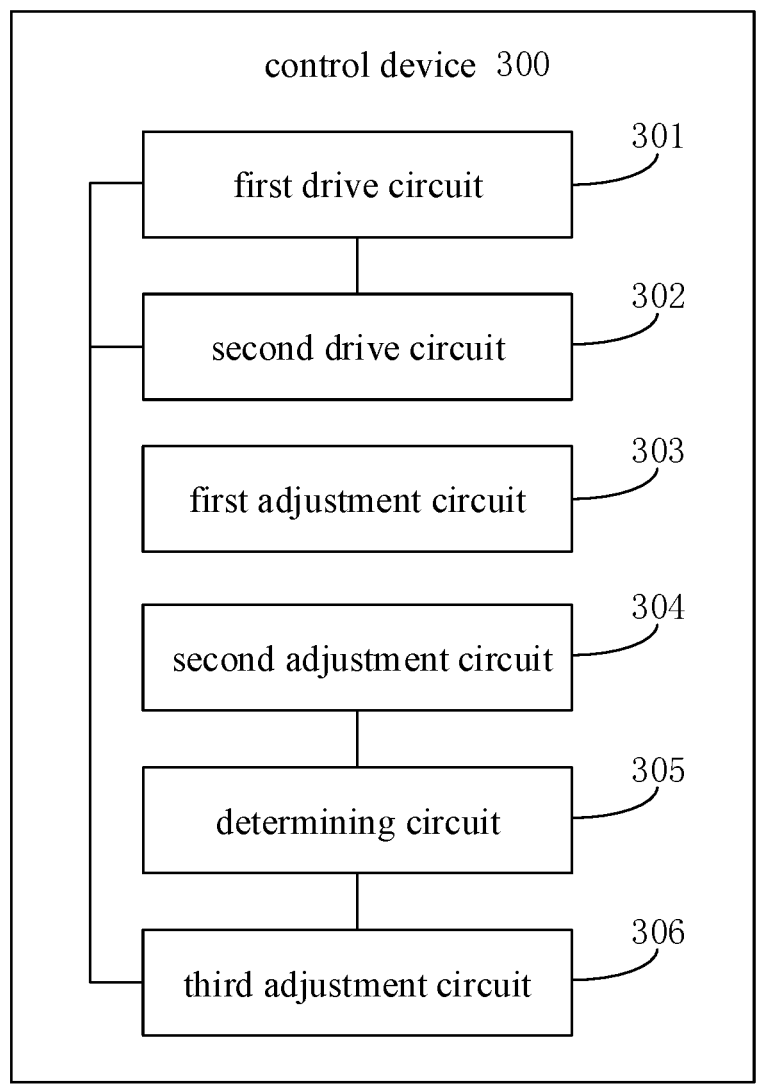
FIG. 15 is a schematic diagram of another control device of a display device provided in an embodiment of the present disclosure.

Alternatively, the display device may further comprise the dimming film arranged between the display panel and the at least one sensor. In this case, as shown in FIG. 15, the control device may further comprise:

a first adjustment circuit 303 configured to adjust the electric field intensity applied on the dimming film to make the dimming film opaque in response to the display panel being in a non-working state;

a second adjustment circuit 304 configured to adjust the electric field intensity applied on the dimming film to make the dimming film transparent in response to the display panel being in a working state.

Alternatively, the second adjustment circuit 304 may be configured to:

adjust the transmittance of the dimming film to be its upper limit in response to the display panel being switched from the non-working state to the working state, or in response to the display panel being in the working state and detecting that a change of actual light intensity of ambient light is greater than a preset light intensity threshold.

As shown in FIG. 15, the control device 300 may further comprise:

a determining circuit 305 configured to determine the actual light intensity of the ambient light according to the light intensity of the ambient light detected by the light intensity sensor and the upper limit of the transmittance;

a third adjustment circuit 306 configured to adjust a brightness of the display panel according to the actual light intensity.

Alternatively, the second adjustment circuit 304 can be further configured to adjust the transmittance of the dimming film to be the specified transmittance according to the actual light intensity of the ambient light. The specified transmittance is smaller than the upper limit of the transmittance, and a product of the actual light intensity and the specified transmittance is greater than or equal to the light intensity sensing lower limit of the at least one sensor in the display device.

Alternatively, the display device may further comprise a camera, and in this case, the second adjustment circuit 304 can be further configured to control the transmittance of the dimming film to remain at its upper limit in response to detection of activation of the camera. In this case, the second drive circuit 302 can further be configured to stop providing data signals to the pixel units in the second display area in response to detection of activation of the camera.

It should be pointed out that each of the first drive circuit, the second drive circuit, the first adjustment circuit, the second adjustment circuit, the determining circuit and the third adjustment circuit mentioned above can be a processor, an application specific integrated circuit, a programmable logic device, etc., which is not restrictive.

It is clear to those skilled in the art that, for the convenience and simplicity of the description, the specific working processes of the control device and circuits described above may refer to the corresponding processes in the embodiments of the methods described above.

Figure 16:
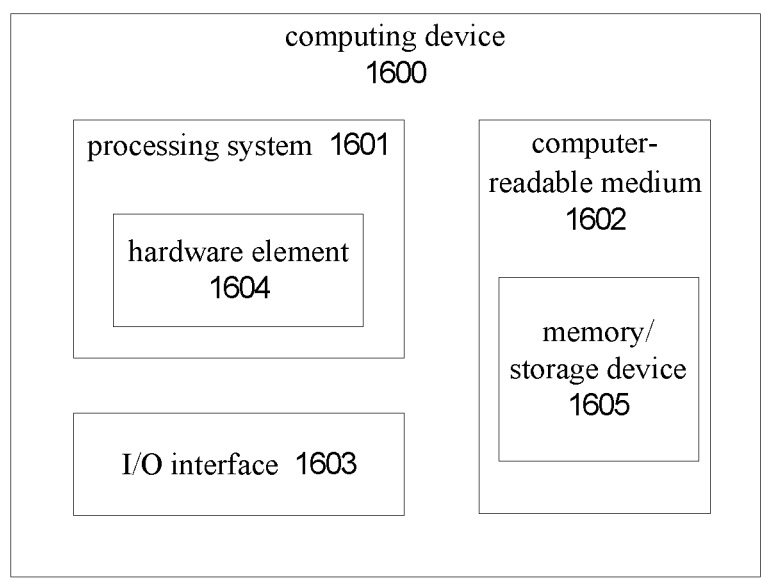
FIG. 16 shows an example computing device that can implement a control method of a display device as described herein.

FIG. 16 shows an example computing device 1600 that can implement the control method as described herein. The computing device 1600 can be, for example, an integrated circuit system, an on-chip system and/or any other suitable computing device or computing system.

The example computing device 1600 shown in the figure comprises a processing system 1601, one or more computer-readable media 1602, and one or more I/O interfaces 1603 communicatively coupled to one another. Although not shown, the computing device 1600 may further comprise system buses for coupling various components to each other or other data and command transmission systems.

The processing system 1601 represents functionality for performing one or more operations using hardware. Accordingly, the processing system 1601 is shown in the figure as including a hardware element 1604, which can be configured as a processor, a functional block, etc. For example, the processor may be composed of semiconductors and/or transistors (e.g., electronic integrated circuits (IC)). In such a context, the processor-executable instructions can be electronically executable instructions.

The computer-readable medium 1602 is illustrated as including a memory/storage device 1605. The memory/storage device 1605 may include a temporary/volatile medium (such as random access memory (RAM)) and/or a non-temporary/non-volatile medium (such as read-only memory (ROM), flash memory, optical disc, magnetic disc, etc.). The memory/storage device 1605 may include a fixed medium (e.g., RAM, ROM, fixed hard disc drive, etc.) and a removable medium (e.g., flash memory, removable hard disc drive, optical disc, etc.).

One or more input/output interfaces 1603 represent functionality for allowing users to input commands and information to the computing device 1600 using various input devices and for allowing presentation of information to users and/or other components or devices using various output devices. Examples of the input devices include keyboards, cursor control devices (e.g., mice), microphones (e.g., for voice input), scanners, touch functionality (e.g., capacitive or other sensors configured to detect physical touch), cameras (e.g. capable of detecting motions (such as gestures) that do not involve touch using visible or invisible wavelengths (such as infrared frequencies)), and so on. Examples of the output devices include display devices (e.g., monitors or projectors), speakers, printers, network cards, tactile response devices, etc.

Various technologies may have been described herein in the general context of software, hardware components or program modules. Generally, these modules include routines, programs, objects, elements, components, data structures that perform specific tasks or implement specific abstract data types. The software, hardware or program modules and other program modules may be implemented as one or more instructions and/or logic embodied on a certain form of computer-readable storage medium and/or be implemented through one or more hardware elements 1604. The computing device 1600 can be configured to execute specific instructions and/or functions corresponding to software and/or hardware modules.

In various implementations, the computing device 1600 can adopt a variety of different configurations, such as computers, mobile devices and televisions. The techniques described herein can be supported by these various configurations of the computing device 1600, and are not limited to specific examples of the techniques described herein. The functionality can also be implemented completely or partially by means of distributed systems, such as on the "cloud". It will be understood by those skilled in the art that the accompanying drawings are only schematic drawings of optional embodiments, and that the modules or processes in the accompanying drawings are not necessarily indispensable for the implementation of the present disclosure It should be noted that the display device provided in the embodiments of the present disclosure may also include the control device illustrated in the above-mentioned embodiments.

The embodiments of the present disclosure also provide a computer-readable storage medium in which computer-executable instructions are stored. The computer-executable instructions, when executed on the processor, can enable the processor to execute the control method of the display device provided in the above-mentioned embodiments.

The above described are only some of the embodiments of the present disclosure and are not intended to limit the present disclosure. It should be pointed out that any modification, equivalent replacement, improvement, etc. made within the spirit and principle of the present disclosure shall fall into the scope of protection of the present disclosure.

The invention claimed is:

1. A display device, comprising:
   a display panel comprising a first display area and a second display area, wherein the second display area comprises a plurality of staggered light-emitting areas and light-transmitting areas;
   at least one sensor located in the second display area and configured to operate according to ambient light sensed through the second display area;
   a dimming film arranged between the display panel and the at least one sensor, an orthographic projection of the dimming film on the display panel covering at least the second display area, wherein the dimming film has different transmittances under different electric field intensities;
   a first drive circuit configured to provide first data signals to pixel units in the first display area of the display panel of the display device;
   a second drive circuit configured to provide second data signals to pixel units in the second display area of the display panel, the second data signals having higher intensity than the first data signals so that the overall display brightness of the display panel is uniform;
   a first adjustment circuit configured to adjust the electric field intensity applied on the dimming film to make the dimming film opaque in response to the display panel being in a non-working state;
   a second adjustment circuit configured to adjust the electric field intensity applied on the dimming film to make the dimming film transparent in response to the display panel being in a working state.

2. The display device according to claim 1, wherein the second display area comprises a plurality of staggered first pixel units and transparent pixel units, each of the first pixel units comprising a light-emitting area, and each of the transparent pixel units comprising a light-transmitting area.

3. The display device according to claim 1, wherein the second display area comprises a plurality of second pixel units, each of the second pixel units comprising at least one light-emitting area and at least one light-transmitting area.

4. The display device according to claim 3, wherein the light-emitting areas and the light-transmitting areas of each second pixel unit are arranged alternately in turn along one of a first direction and a second direction, and there is an angle between the first direction and the second direction.

5. The display device according to claim 4, wherein the plurality of second pixel units are arranged along the first direction, and the light-emitting areas and light-transmitting areas of any two adjacent second pixel units are arranged alternately along the first direction.

6. The display device according to claim 1, further comprising a determining circuit and a third adjustment circuit, and the at least one sensor comprises a light intensity sensor, wherein
the second adjustment circuit is further configured to adjust the transmittance of the dimming film to be its upper limit in response to one of the following: the display panel being switched from the non-working state to the working state; and the display panel being in the working state and detection that a change of actual light intensity of ambient light is greater than a preset light intensity threshold;
the determining circuit is configured to determine the actual light intensity of the ambient light according to the light intensity of ambient light detected by the light intensity sensor and the upper limit of the transmittance;
the third adjustment circuit is configured to adjust a brightness of the display panel according to the actual light intensity.

7. The display device according to claim 6, wherein
the second adjustment circuit is further configured to adjust the transmittance of the dimming film to be a specified transmittance according to the actual light intensity of the ambient light;
wherein the specified transmittance is smaller than the upper limit of the transmittance, and a product of the actual light intensity and the specified transmittance is not less than a light intensity sensing lower limit of the at least one sensor in the display device.

8. The display device according to claim 1, wherein the at least one sensor further comprises: a camera; and wherein
the second adjustment circuit is further configured to control the transmittance of the dimming film to remain at its upper limit in response to detection of activation of the camera, so that the camera can effectively sense the ambient light.

9. A control method of a display device for controlling the display device of claim 1, comprising:
providing first data signals to pixel units in the first display area of the display panel of the display device;
providing second data signals to pixel units in the second display area of the display panel, the second data signals having higher intensity than the first data signals;
adjusting the electric field intensity applied on the dimming film to make the dimming film opaque in response to the display panel being in a non-working state;
adjusting the electric field intensity applied on the dimming film to make the dimming film transparent in response to the display panel being in a working state.

10. The method according to claim 9, wherein said adjusting the electric field intensity applied on the dimming film to make the dimming film transparent in response to the display panel being in a working state comprises:
adjusting the transmittance of the dimming film to be its upper limit in response to one of the following: the display panel being switched from the non-working state to the working state; and the display panel being in the working state and detection that a change of actual light intensity of ambient light is greater than a preset light intensity threshold;
and the method further comprises:
determining the actual light intensity of the ambient light according to the light intensity of ambient light detected by a light intensity sensor and the upper limit of the transmittance;
adjusting a brightness of the display panel according to the actual light intensity.

11. The method according to claim 10, wherein after determining the actual light intensity of the ambient light, the method further comprises:
adjusting the transmittance of the dimming film to be a specified transmittance according to the actual light intensity of the ambient light;
wherein the specified transmittance is smaller than the upper limit of the transmittance, and a product of the actual light intensity and the specified transmittance is not less than a light intensity sensing lower limit of the at least one sensor in the display device.

12. The method according to claim 9, wherein the display device further comprises a camera; and
the method further comprises: in response to detection of activation of the camera,
controlling the transmittance of the dimming film to remain at its upper limit.

13. A computer-readable storage medium storing computer-executable instructions thereon, the computer-executable instructions, when being executed on a processor, enabling the processor to implement the control method of the display device according to claim 9.

14. A computing device, comprising a processor and a memory, the memory being configured to store computer-executable instructions that are configured to enable the processor to implement the control method of the display device according to claim 9 when being executed on the processor.

15. The display device according to claim 4, wherein
the plurality of second pixel units are arranged along the second direction, and the light-emitting areas and light-transmitting areas of any two adjacent second pixel units are arranged alternately along the second direction.

16. The method according to claim 9, wherein the display device further comprises a camera; and
the method further comprises: in response to detection of activation of the camera, controlling the transmittance of the dimming film to remain at its upper limit and stopping providing data signals to the pixel units in the second display area.

* * * * *